(12) United States Patent
Araujo et al.

(10) Patent No.: US 7,108,501 B2
(45) Date of Patent: Sep. 19, 2006

(54) INJECTION BLOW MOULDING APPARATUS FOR PRODUCING BIAXIAL ORIENTED THERMOPLASTIC CONTAINERS

(75) Inventors: Paulo Juliano Pereira da Silva Araujo, Marinha Grande (PT); Antonio Pereira Santos, Martinganca (PT)

(73) Assignee: Plasdan-Projectos Industriais Para a Industria de Plasticos, S.A., (PT)

( * ) Notice: Subject to any disclaimer, the term of this patent is extended or adjusted under 35 U.S.C. 154(b) by 184 days.

(21) Appl. No.: 10/492,445

(22) PCT Filed: Feb. 11, 2002

(86) PCT No.: PCT/PT02/00003

§ 371 (c)(1),
(2), (4) Date: Apr. 13, 2004

(87) PCT Pub. No.: WO03/068483

PCT Pub. Date: Aug. 21, 2003

(65) Prior Publication Data

US 2004/0185133 A1    Sep. 23, 2004

(51) Int. Cl.
*B29C 49/06* (2006.01)
*B29C 49/12* (2006.01)

(52) U.S. Cl. .............. 425/529; 425/533; 425/534; 425/540; 425/541

(58) Field of Classification Search ............... 425/529, 425/533, 534, 540, 541, 576
See application file for complete search history.

(56) References Cited

U.S. PATENT DOCUMENTS

| 3,832,101 | A | * | 8/1974 | Rainville ............ 425/535 |
| 3,985,485 | A | * | 10/1976 | Farrell ............ 425/516 |
| 4,063,867 | A | * | 12/1977 | Janniere ............ 425/526 |
| 4,144,013 | A | * | 3/1979 | Simmons ............ 425/533 |
| 4,379,688 | A | * | 4/1983 | Tate et al. ............ 425/526 |
| 4,427,359 | A | * | 1/1984 | Fukuoka et al. ............ 425/525 |

FOREIGN PATENT DOCUMENTS

EP    92904 A1 * 11/1983

* cited by examiner

*Primary Examiner*—Robert B. Davis
(74) *Attorney, Agent, or Firm*—Galbreath Law Offices, P.C; John A. Galbreath

(57) ABSTRACT

The present invention refers to an Integrated Injection-Stretch-Blow Mold suitable for producing bi-orientated thermoplastics containers, which can be installed in an injection molding machine, occupying the space normally destined for injection molds. It consists of a central chassis (8) having in its interior a central block mechanism (30), with the injection cores (6cores (12) and the mechanisms for stretch and blow (9, 13, 23) and for release of the finish containers (18, 20); a motorized system (31), connected to the central block mechanism (30), by a rotating plate shaft (11), for the transport of the performs at least an injection mold (1) and a blow mold (14) placed around the central chassis (8).

1 Claim, 5 Drawing Sheets

INJECTION BLOW MOULDING APPARATUS FOR PRODUCING BIAXIAL ORIENTED THERMOPLASTIC CONTAINERS

DESCRIPTION

The present invention refers to a mold suitable for producing containers in P.E.T. (Polyethylene terephthalate), P.V.C. (Polyvinyl chloride), P.P. (Polypropylene) and other bi-orientated thermoplastics, by injection-stretch-blow molding.

The process of producing containers in bi-orientated thermoplastics, namely in P.E.T, have as common designation, molding by injection-stretch-blow. The process is accomplished using machines that are simultaneously capable of injection and stretch-blow molding, or in two independent machines, one being of injection and the other of stretch-blow, that do not necessarily have to be at the same location.

The molding process by injection-stretch-blow starts with an intermediate molding of the container, designated preform, in an injection mold, through the process of molding by injection. As a second step (which can be separated), the preform that is at an adequate temperature is mechanically stretched and blown in the blow-mold, causing the container to acquire its final form. This process of molding, of which the production of containers in P.E.T. and other thermoplastics are associated, is the combination of two processes, offering the best benefits of both. In this way the containers are bi-axially extended which guarantees characteristics of impact strength, stiffness, transparency and surface gloss.

A perfect and rentable production of plastic containers is only possible with molds technically compatible with the machines in which they are installed. The degree of complexity of the mold basically depends on economical and technological aspects, such as the number of pieces to produce, defined specifications of the pieces and machine where the pieces will be processed.

The production of bi-orientated thermoplastic containers, namely P.E.T, is as already mentioned, realized in injection stretch-blow machines, especially developed for this effect, as the molds used do not incorporate the necessary mechanisms to manufacture the complete article.

The present invention has as a principal component a central chassis, whose constitution and functionality allows for the production of containers in P.E.T, P.V.C, P.P and other bi-orientated thermoplastics, by the process of molding by injection and stretch-blow, with a minimum of associated equipment. The mechanism for the injection-stretch-blow process, which is usually associated to machines, is integrated in the central chassis of the MOLD, enabling it to be easily installed in an injection molding machine, occupying the space normally destined for injection molds.

According to the present invention, the objective of producing containers in an injection molding machine is accomplished due to a different concept of positioning the mechanical equipment necessary for the production of containers; positioning at least an injection-mold and a blow-mold around a central chassis, which contains in its interior an automated central block mechanism, with the stretch-blow equipment, the injection and blow cores and ejection mechanism of the finished containers, to which is coupled a motorized rotating system to transport the preforms to the different positions of production around the central chassis. This creates the necessary conditions to complete the productive cycle.

The integrated injection-stretch-blow mold, in accordance with the present invention, is supported on the base and on the platens of an injection-molding machine, using the natural movement of the machine platens, the opening and closing of the INTEGRATED MOLD is accomplished.

The rotating system, supported on the central block mechanism, provides the transport movement of the preforms, from the injection position to a waiting position, that can be used for temperature conditioning, if required to the stretch-blow position and finally to the ejection position, returning to the injection position, when a new cycle commences.

Referring to the annexed drawings, which show the constitution of the integrated mold:

Figure 1:
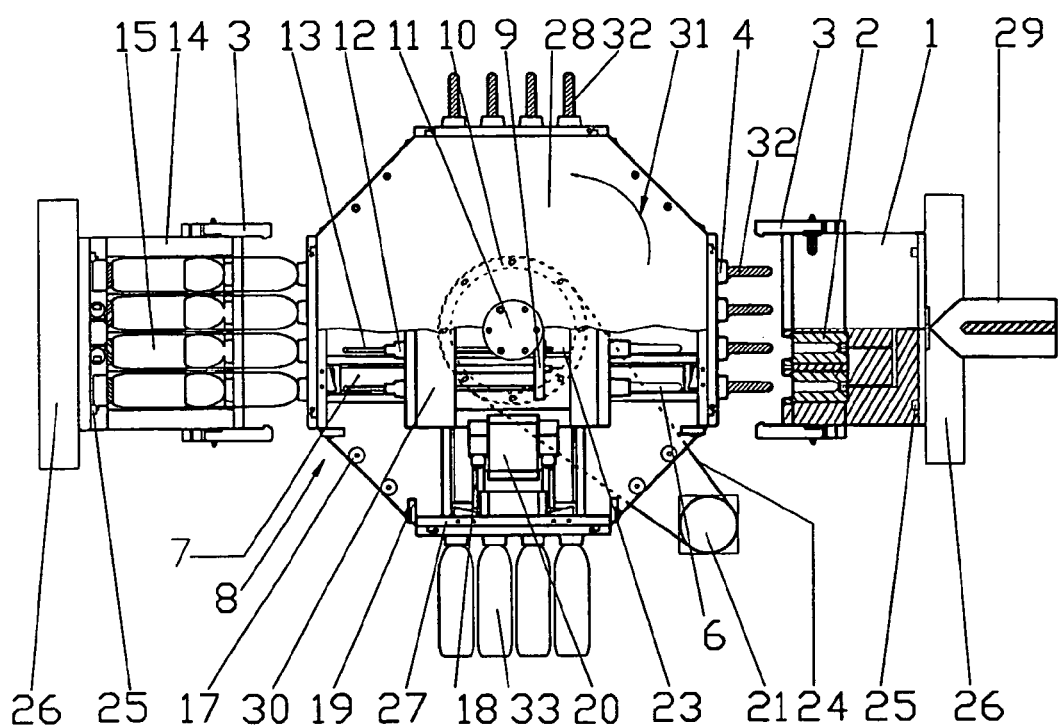
FIG. 1 is a top view representing the constitution of the present invention, in a totally open position, with partial broken views showing the interior components.
Figure 2:
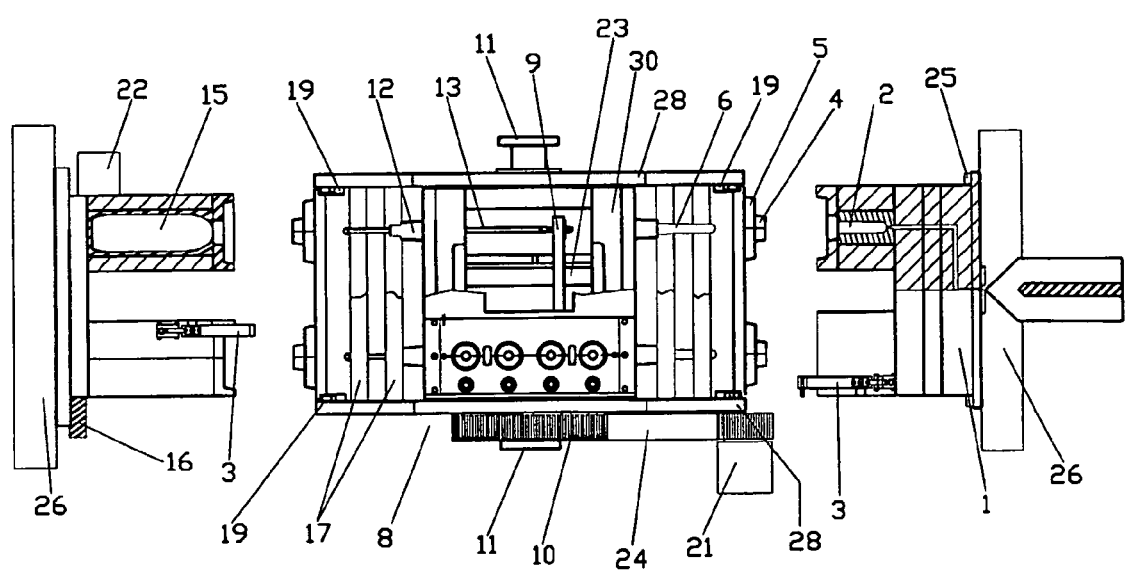
FIG. 2 is a lateral view of the invention, in a totally open position, with partial broken views, showing the interior components.

The INTEGRATED MOLD consists of 3 separate parts, as shown in figures 1 and 2; a central chassis (8). an injection mold (1) and a blow mold (14).

Figure 5:
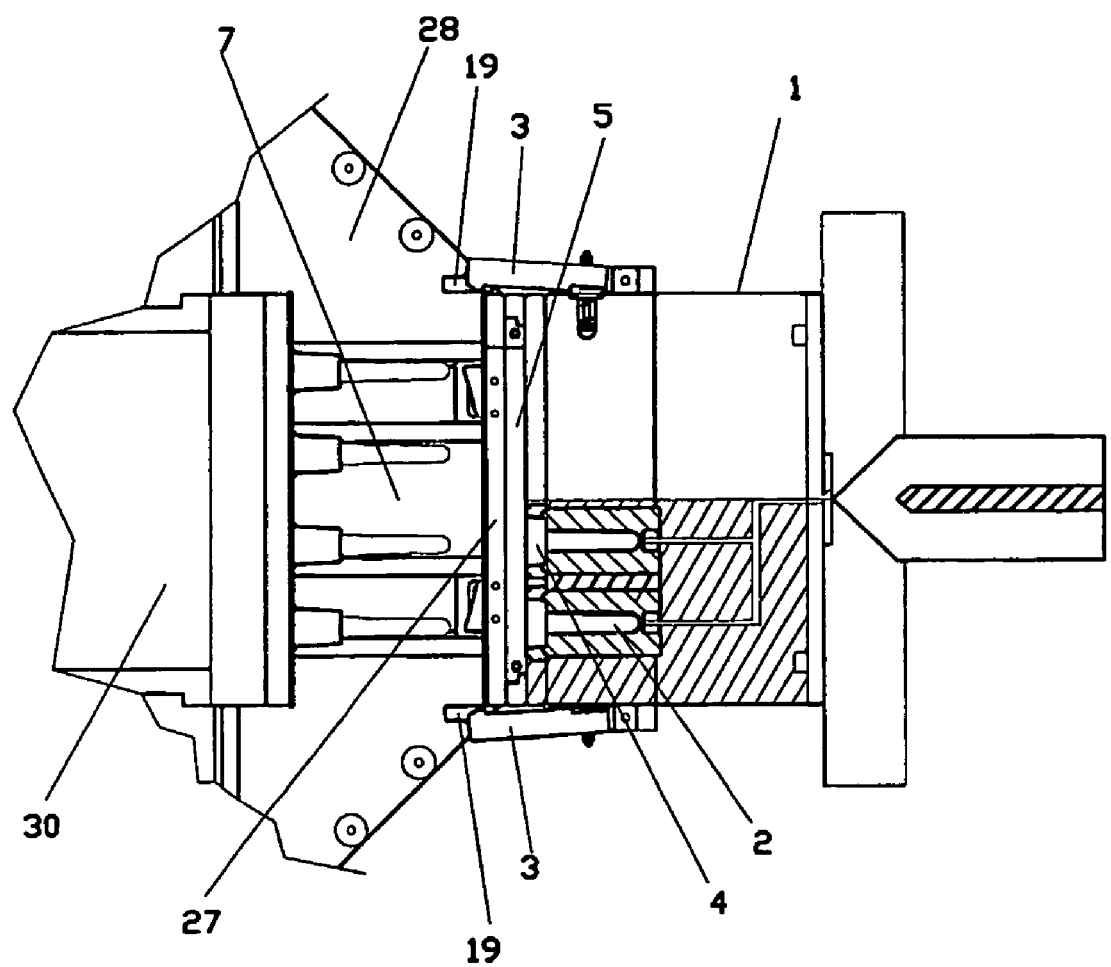
FIG. 5 represents a detailed view, on an enlarged scale, showing the opening mechanism of the INTEGRATED MOLD, injection side.

The central chassis (8) is supported on the base structure of the injection machine, comprising in its interior a central block mechanism (30), where the injection cores (6), the stretch cylinder (23), stretch rods (13), stretch plates (9), blow cores (12) and the release mechanism (FIG. 6), comprising of a cylinder (20) and lip plate ejector wedge (18) that opens the lip plate (5), are fixed. Supported at the rotating plate shaft (11 FIG. 1) of the central block mechanism (30), is located the rotating mechanism (31), comprising two rotating plates (28), coupled via tie-bars (17) and centered on the two rotating plate shafts (11). The rotating plates (28) are set in motion by a motor (21) acting on the driven gear (10) of the rotating mechanism (31) via a transmission belt (24). Fixed in the interior of the rotating plates (28), are the sliding bars (7 FIG. 1 and 5) for preform carrier plate (27) movement, as well as carrier plate opening limit cams (19) for opening the latch (3).

The injection mold (1) is mounted on the machine platen (26) closest to the injection unit, through the fixing screws (25). The latches (3 FIG. 1 and 5) are fixed to the injection mold (1) and used to move the preform carrier plates (27 FIG. 1 and 5). A partial broken view of the mold drawing shows the injection cavities (2).

The blow mold (14), as shown in this mounting example, is fixed to the machine platen (26), on the opposite side of the injection, to which is also applied latch (3) to move the preform carrier plate (27). In the mold drawing, FIGS. 1 and 4, the cavities (15) appear represented in broken view. The lateral opening and closing of the blow mold (14) is performed by a roller screw (16 FIG. 2), set in motion by a motor (22).

Figure 3:
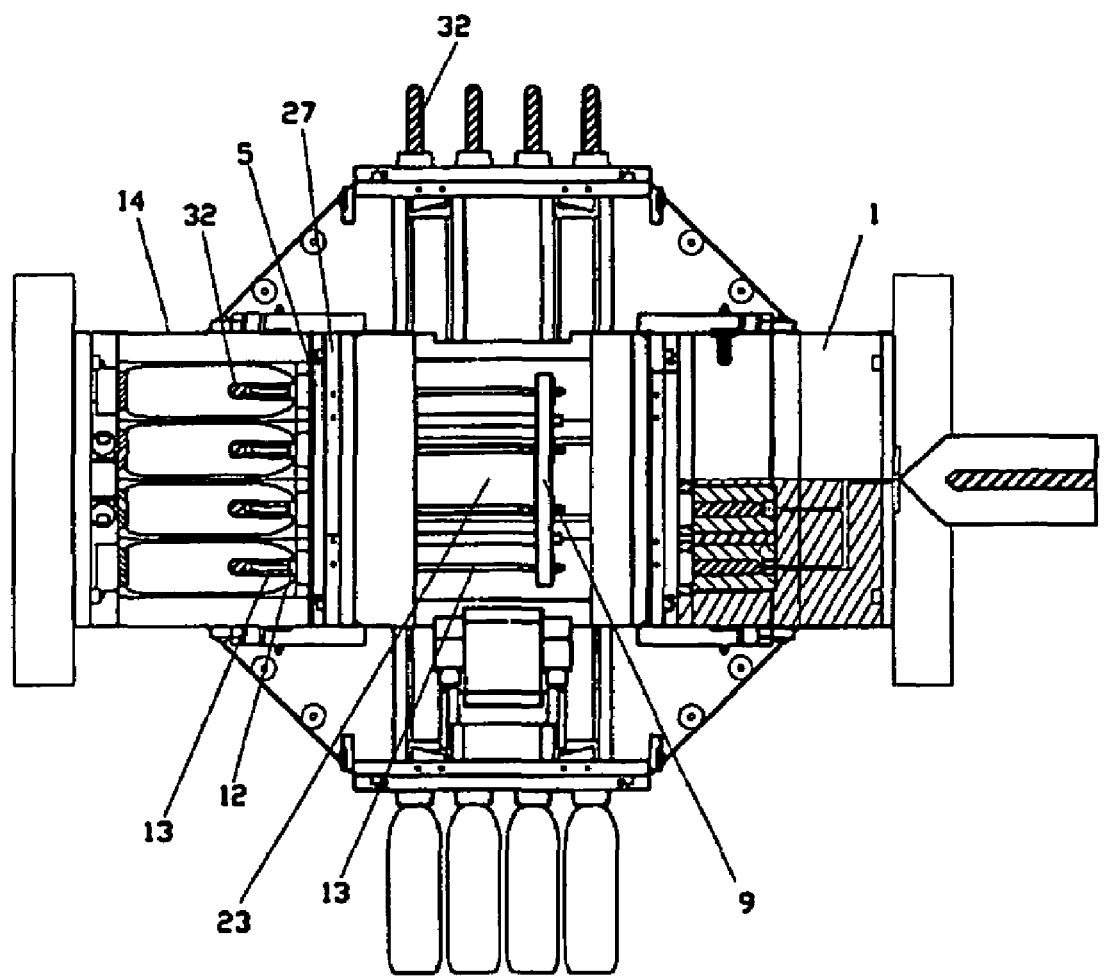
FIG. 3 and 4 represents a top view of the INTEGRATED MOLD, in the completely closed position, showing the stretch-blow mechanism.
Figure 4:
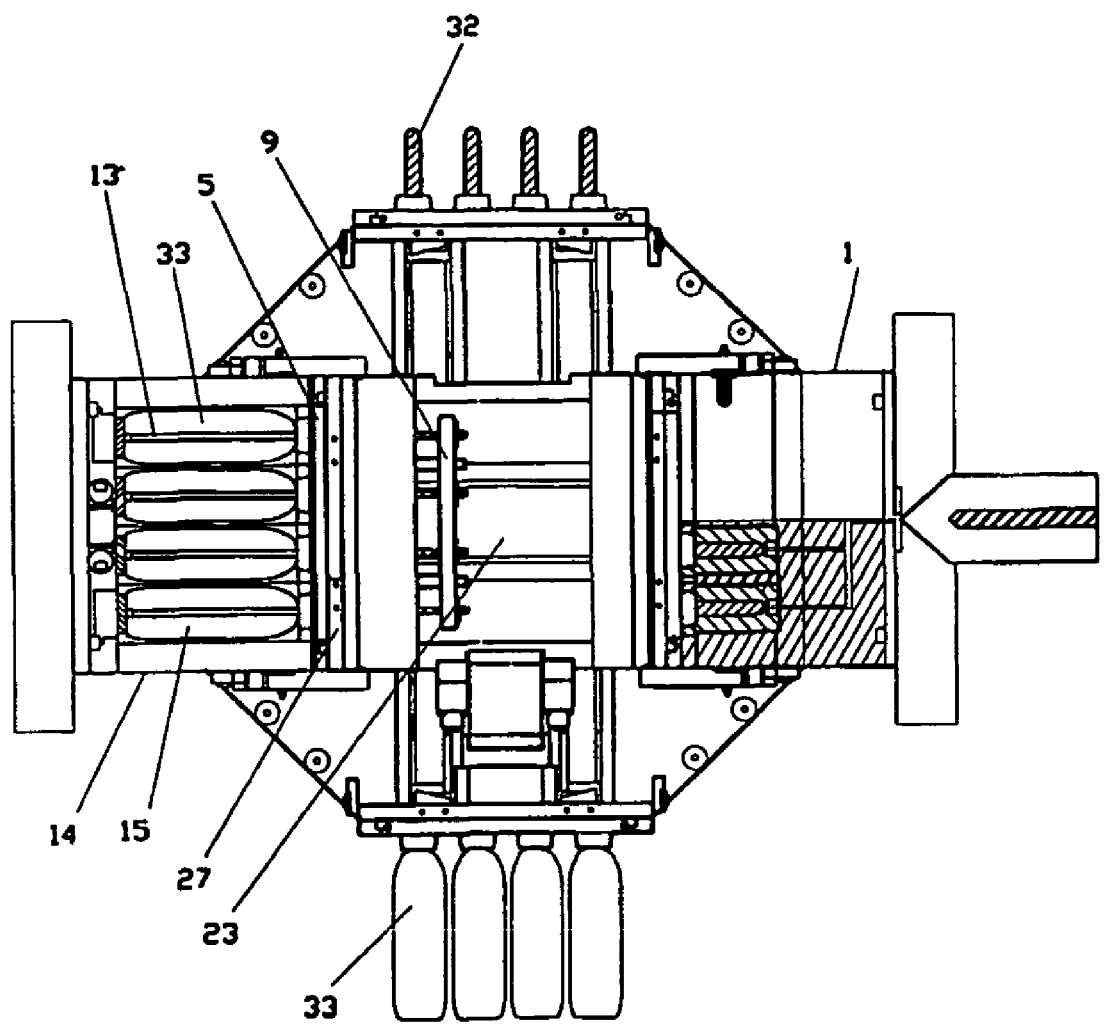

To easily understand not only the conception, but also the use of the invention, below is a functional description referring to a complete production cycle, with references to the annexed drawings, being the mentioned example merely an explanation and in no case a limitation of the same, in which:

As illustrated in FIGS. 1 and 2, the INTEGRATED MOLD is initially in the totally open position, including the lateral opening of the blow mold (14). All the cavities (2 and 15) and preform carrier plate (27) are empty. From this initial starting point, the blow mold closing motor (22 FIG. 2) is set in motion causing the roller screw (16) to rotate, laterally closing the blow mold (14). The injection molding machine then closes its platens (26) totally closing the integrated mold, as shown in FIGS. 3 and 4. At this point, the molten plastic is injected into the injection mold (1), forming the first set of preforms (32 of FIG. 1). Once the preforms are solid, the integrated mould is opened completely. The preforms (32) are rotated anti-clockwise though 90 degrees by the rotating system (31). The first set of preforms (32) are now at the waiting position, between the injection and blow molds. If required, the preforms (32) are acted upon by peripheral equipment.

The INTEGRATED MOLD is again completely closed, so that a second set of preforms (32) are injected in the injection mold (1): Once the preforms are solid, the integrated mold opens completely and the rotation system (31) again rotates the preforms through another 90 degrees, positioning the first set of preforms (32) at the frontal position of the blow mold (14) and the second set at the waiting position.

At the next closing sequence, a third set of preforms are injected whilst at the same time the first set of preforms are being stretched and blown so that the finished container can be obtained. The stretch operation is carried out by the stretching cylinders (23) which move the stretch plate (9) causing the stretch rods (13) to elongate the preforms to the full length of the container. Once this stretching action is complete, the elongated preforms are blown so that the hot plastic is forced against the mold walls thereby obtaining the final container shape (33). At this point, the INTEGRATED MOLD is then opened. The rotation system (31) is again rotated through 90 degrees, causing the finished containers (33) to be placed at the ejection position and the second set of preforms to be placed in front of the blow mold (14).

The fourth closing sequence is the same as the third, with the exception that once the mold is closed, in parallel to the injection and stretch-blow, the finished complete containers (33) will be ejected. This ejection is accomplished by actuating cylinder (20) which is connected to the lip cavity ejector wedge (18) and this causes the lip cavity plate (5) to open, causing the release of the finished containers (33). Return springs force the lip plate (5) to return to its original position. At the fourth opening, the rotation system (31) is again rotated through 90 degrees, placing the now empty preform carrier plates (27) in front of the injection mould, all conditions being met to start a new cycle.

The operating cycle is carried out sequentially as follows:
Close; Injection, stretch-blow and ejection;
Opening; Rotation . . . and so on successively, the process repeats.

Always during the opening stroke of the INTEGRATED MOLD, both the preform carrier plates (27 of FIG. 5) are moved to the edge of the rotating plate (28) by the latch (3). Once the preform carrier plate (27) is in position, the latch (3) is released by carrier plate opening limit cam (19), permitting the total opening of the integrated mold. In this way the preform carrier plates (27) stay in position for transport and allow the rotation to be accomplished. The same procedure occurs for the blow mold (14).

The integrated injection-stretch-blow mold, conceived in accordance with the present invention, presents various advantages.

Due to the fact that the central chassis of the INTEGRATED MOLD combines all necessary production stages, and integrates all the mechanisms necessary for the process, it is possible that with a minimum of associated equipment, injection unit and sustaining platens, an economical production of bi-orientated thermoplastic containers is achieved, resulting in lower costs of investment, especially in machines.

This invention is a compact INTEGRATED MOLD of easy installation, interchangeable, that can be installed in different machines. For the operation of this invention, the only space required is that which is normally occupied in an injection machine by an injection mold, maximizing the use of existing equipment and not requiring the use of specially developed machinery for this process.

NOMENCLATURE

1. Injection mold
2. Injection cavity
3. Latch
4. Lip cavity
5. Lip plate
6. Injection core
7. Sliding Bar
8. Central chassis
9. Stretch plate
10. Rotating plate driven gear
11. Rotating plate shaft
12. Blow core
13. Stretch rod
14. Blow mold
15. Blow mold cavity
16. Roller screw
17. Rotating plate tie bar (28)
18. Lip plate ejector wedge
19. Carrier plate opening limit cam
20. Ejecting mechanism
21. Rotating plate motor
22. Blow mold open/close motor
23. Stretch cylinder
24. Transmition belt
25. Fixing screw
26. Injection machine platens
27. Preform carrier plates
28. Rotating plates
29. Injection unit
30. Central block mechanism
31. Rotating mechanism (10, 21, 24 e 28)
32. Preforms
33. Finished Containers

The invention claimed is:

1. INTEGRATED MOLD FOR THE PRODUCTION OF CONTAINERS IN BI-ORIENTATED THERMOPLASTICS, characterized by the fact, that it can be installed in an injection molding machine, occupying the space normally destined for injection molds and comprising a central chassis (8), around which are at least one injection mold and one stretch-blow mold are placed; The central chassis (8) comprises a central block mechanism (30) where the injection and blow cores, the ejection and the stretch-blow mechanism (9, 13, 23) are attached; In the central chassis (8) and mounted on two rotating plate shafts (11) of the central block mechanism (30) is a motorized rotating mechanism (31), consisting of two rotating plates (28), to transport the preforms from one position to another, on the periphery of the central chassis (8); As the rotating plates (28) are fixed via the rotating plate tie-bars (17) and have on their interior surface sliding bars (7) of the preform carrier plates (27) and carrier plate opening limit cams (19), to open the latches (3), placed on both the injection and blow molds, that drag the preform carrier plates (27) during the opening of the integrated mold to the edge of the rotating plates (28), where they are then in the position to transport the preforms, during the productive cycle, which, while explanatory and simplified, starts after the mounting and positioning of the integrated mould in the totally open position, with the preform carrier plates (27) ready for preform transport and with all the cavities and preform carrier plates (27) empty; After the lateral closing of the blow mold, the injection molding machine then closes its platens and concludes the total closing of the integrated mold at this point, the molten plastic is injected into the injection mold forming the first set of preforms, once the preforms are solid, the machine platens move and the INTEGRATED MOLD is fully open, wit the performs positioned for transport on the edge of the Rotating Plates (28); now starts the movement of the Rotating Mechanism (31), in a synchronized way, and the first set of preforms goes to an intermediate waiting position, between the injection and blow molds; the INTEGRATED MOLD is again completely closed, so that a second set of preforms is injected in the injection mold, again total opening of the INTEGRATED MOLD and rotation, after this the first set of preforms are placed in front of the blow mold; total close of the INTEGRATED MOLD and a third set of preforms are injected whilst at the same time the first set of preforms are being stretched and blown, so that the finished containers can be obtained; again total opening of the INTEGRATED MOLD, the rotation system (31) is again rotated causing the first set of finished containers to be placed at the ejection position; Again the integrated mold is completely closed, and ejection of the finished containers is carried out in parallel wit the injection of the fourth set of preforms and the stretch-blow of to second set of preforms; Alter a new opening stroke and rotation cycle the now empty preform carrier plates (27) are placed in front of the injection mold, so that after the next closing of the integrated mold a new production cycle starts and the process repeats, injection, stretch-blow, ejection, opening, rotation and so on successively.

\* \* \* \* \*